United States Patent
Hetherington et al.

(10) Patent No.: US 11,348,595 B2
(45) Date of Patent: May 31, 2022

(54) VOICE INTERFACE AND VOCAL ENTERTAINMENT SYSTEM

(71) Applicants: 2236008 Ontario Inc., Waterloo (CA); BlackBerry Limited, Waterloo (CA)

(72) Inventors: Phillip Alan Hetherington, Port Moody (CA); Shreyas Anand Paranjpe, Burnaby (CA); Leonard Charles Layton, Burnaby (CA)

(73) Assignees: BlackBerry Limited, Waterloo (CA); 2236008 Ontario Inc., Waterloo (CA)

( * ) Notice: Subject to any disclaimer, the term of this patent is extended or adjusted under 35 U.S.C. 154(b) by 0 days.

(21) Appl. No.: 15/835,215

(22) Filed: Dec. 7, 2017

(65) Prior Publication Data
US 2018/0190307 A1   Jul. 5, 2018

Related U.S. Application Data

(60) Provisional application No. 62/442,284, filed on Jan. 4, 2017.

(51) Int. Cl.
*G10L 21/00* (2013.01)
*G10L 21/0208* (2013.01)
(Continued)

(52) U.S. Cl.
CPC .......... *G10L 21/0208* (2013.01); *G06F 3/167* (2013.01); *G10L 15/20* (2013.01);
(Continued)

(58) Field of Classification Search
CPC ....... G10L 2021/02082; G10L 21/0232; G10L 21/0208; G10L 2021/02166; G10L 15/22;
(Continued)

(56) References Cited

U.S. PATENT DOCUMENTS 8,175,871 B2 * 5/2012 Wang .................... H04M 9/082
                                                              379/406.01
9,111,326 B1   8/2015 Worley et al.
(Continued)

FOREIGN PATENT DOCUMENTS

| EP | 3346466 | 7/2018 |
|---|---|---|
| WO | 2016085776 | 6/2016 |
| WO | 2017138934 | 8/2017 |

OTHER PUBLICATIONS

Benesty, D.R. Morgan, and M.M. Sondhi, "A better under-standing and an improved solution to the specific croblems of stereophonic acoustic echo cancellation," IEEE Transactions on Speech and Audio Processing, vol. 6, No. 2, pp. 156-165, 1998.*
(Continued)

*Primary Examiner* — Edgar X Guerra-Erazo
(74) *Attorney, Agent, or Firm* — Ridout and Maybee LLP

(57) ABSTRACT

A system and method that enhances spoken utterances and provides entertainment by capturing one or more microphone signals containing echo and decomposing the one or more microphone signals into a plurality of signal paths through a synthesizer that adds or makes non-linear modifications to some of the captured one or more microphone signals. The system and method and estimates multiple echo paths from each of the one the one or more microphones. The system and method processes the captured microphone signals in response to the estimated plurality of echo paths by subtracting the echo contributions of each of the plurality of echo paths from the captured one or more microphone signals. The system and method also provide signal separation and post processing functions that renders speech recognition gaming applications.

18 Claims, 11 Drawing Sheets

(51) Int. Cl.
*G06F 3/16* (2006.01)
*G10L 15/20* (2006.01)
*H04M 9/08* (2006.01)
*G10L 21/02* (2013.01)
*H04R 3/02* (2006.01)
*G10L 21/0216* (2013.01)

(52) U.S. Cl.
CPC .............. *G10L 21/02* (2013.01); *H04M 9/082* (2013.01); *G10L 2021/02082* (2013.01); *G10L 2021/02161* (2013.01); *H04R 3/02* (2013.01); *H04R 2430/01* (2013.01)

(58) Field of Classification Search
CPC ............... G10L 2015/088; G10L 21/02; G10L 21/0216; G10L 25/84; G10L 2021/02087; G10L 21/0272; G10L 21/028; G10L 21/0308; G10L 2025/783; G10L 2021/02085; G10L 2021/02165; G10L 2021/02161; G10L 2021/02168; G10L 21/0224; G10L 25/06; G10L 25/12; H04M 9/082; H04M 9/08; H04M 3/568; H04M 3/002; H04M 1/20; H04R 3/005; H04R 3/02; H04R 3/04; G06F 3/167; H04S 7/00; H04S 7/30; H04S 7/301; H04S 7/302; H04S 7/303; H04S 7/305; H04S 7/40; H04S 2400/01; H04S 2400/15; H04S 2400/03; H04S 2420/01; H04S 2420/03; H04S 2420/07; H04S 2420/11; H04S 2420/13; B60R 25/257; G10K 11/17823; G10K 11/17813; G10K 11/17815; G10K 11/17817; G10K 11/17819; G10K 11/17821; G10K 2210/12; G10K 2210/12821; G06N 20/00; G06N 3/08; G06N 3/082; G06N 3/084; G06N 3/088; G06N 20/10; G06N 20/20
USPC ............................................ 700/94; 715/762
See application file for complete search history.

(56) References Cited

U.S. PATENT DOCUMENTS

| | | | |
|---|---|---|---|
| 9,818,407 B1 | 11/2017 | Secker-Walker | |
| 2002/0049596 A1 | 4/2002 | Burchard et al. | |
| 2005/0265560 A1 | 12/2005 | Haulick et al. | |
| 2007/0110254 A1* | 5/2007 | Christoph | H04R 3/02 704/E21.007 |
| 2010/0020984 A1 | 1/2010 | Janse et al. | |
| 2011/0093273 A1 | 4/2011 | Lee et al. | |
| 2012/0197637 A1 | 8/2012 | Gratke et al. | |
| 2013/0179163 A1* | 7/2013 | Herbig | G10L 25/84 381/86 |
| 2014/0301558 A1 | 10/2014 | Fan | |
| 2015/0194151 A1 | 7/2015 | Jeyachandran | |
| 2015/0206529 A1 | 7/2015 | Kwon et al. | |
| 2018/0108351 A1 | 4/2018 | Beckhardt et al. | |
| 2018/0190282 A1* | 7/2018 | Mohammad | H04R 3/005 |
| 2018/0190306 A1* | 7/2018 | Hetherington | H04M 9/082 |
| 2019/0066680 A1 | 2/2019 | Woo | |
| 2019/0073999 A1 | 3/2019 | Premont | |

OTHER PUBLICATIONS

Withopf et al. ("Estimation of Time-Variant Acoustic Feedback Paths in In-Car Communication Systems", 2014 14th International Workshop on Acoustic Signal Enhancement (IWAENC), IEEE, Sep. 8, 2014, pp. 104-108).*
Ortega, A., Lleida, E., & Masgrau, E. (2005). Speech reinforcement system for car cabin communications. IEEE Transactions on Speech and Audio Processing, 13(5), 917-929. (Year: 2005).*
European Search Report corresponding to EP Application No. 18150266.7 dated Mar. 16, 2018, 11 pages.
Schmidt, Gerald et al., "Signal processing for in-car communication systems", Signal Processing, Elsevier Science Publishers B.B. Amsterdam, NL, vol. 86, No. 6, Jun. 1, 2006, pp. 1307-1326.
Toon Van Waterschoot et al., Fifty Years of Acoustic Feedback Control: State fo the Art and Future Challenges, Proceedings of the IEEE., vol. 99, No. 2, Feb. 1, 2011, pp. 288-327.
Withopf Jochen et al., "Estimation of Time-Variant Acoustic Feedback Paths in In-Car communications Systems", 2014 14$^{th}$ International Workshop on Acoustic Signal Enhancement (IWAENC), IEEE, Sep. 8, 2014, pp. 104-108.
Extended European Search Report; dated May 7, 2018; 18150255.0.
J. Benesty, D.R. Morgan, and M.M. Sondhi, "A better understanding and an improved solution to the specific problems of stereophonic acoustic echo cancellation," IEEE Transactions on Speech and Audio Processing, vol. 6, No. 2, pp. 156-165 1998.
L. Romoli, S. Cecchi, and F. Piazza, "A combined approach for channel decorrelation in stereo acoustic echo cancellation exploiting time-varying frequency shifting," IEEE Signal Pro-cessing Letters, vol. 20, No. 7, pp. 717-720 2013.
Schmidt, Gerald et al., "Signal processing for in-car communication systems", Signal Processing, Elsevier Science Publishers B.B. Amsterdam, NL, vol. 86, No. 6, Jun. 1, 2006, pp. 1307-1326. Jun. 1, 2006.
Office Action; U.S. Appl. No. 15/835,187 dated Mar. 26, 2019.
Final Rejection; U.S. Appl. No. 15/835,187 dated Jun. 26, 2019.
Architecture Guide, QNX CAR Platform for Infotainment 2.1, QNX Software Systems Limited, 62 pages 2014.
Communication Pursuant to Article 94(3); EP 18150255.0 dated Aug. 1, 2019.
Communication Pursuant to Article 94(3); EP 18150266.7 dated Aug. 1, 2019.
Extended European Search Report; EP 19219978.4 dated Apr. 22, 2020.
Summons to attend oral proceedings pursuant to Rule 115(1) EPC; EP 18150255.0 Feb. 24, 2020.
Multichannel Speech Separation by Eigendecomposition and it's Application to Co-Talker Interference Removal; Cao et al. May 3, 1997.
Summons to attend Oral Proceedings Pursuant to Rule 115(1) EPC; EP18150266.7 Mar. 2, 2020.
Office Action; U.S. Appl. No. 16/241,327 dated Aug. 19, 2020.
Final Rejection; U.S. Appl. No. 16/241,327, dated Apr. 29, 2021.
Advisory Action; U.S. Appl. No. 16/241,327 dated Jul. 7, 2021.

* cited by examiner

VOICE INTERFACE AND VOCAL ENTERTAINMENT SYSTEM

PRIORITY CLAIM

This application claims priority to U.S. Provisional Patent Application No. 62/442,284, filed Jan. 4, 2017, titled "Voice Interface and Vocal Entertainment System," which is herein incorporated by reference.

BACKGROUND OF THE DISCLOSURE

1. Technical Field

This disclosure relates to processing audio signals and in particular, to a voice interface and a vocal entertainment system.

2. Related Art

To increase safety, drivers must remain awake and alert. Passive entertainment can keep drivers comfortable, but also cause fatigue and boredom that can lead to inattention. Active entertainment, such as singing and interactive audio games, can keep drivers awake, entertained, and more engaged when driving.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Modern vehicles use multiple acoustic and audio signal-processing systems, all running simultaneously. Much of the technology is directed to reducing noise in the vehicle cabin or adapting to noise conditions. Acoustic systems adapt to noise conditions by capturing a talker's voice, amplifying (reinforcing) it, and then playing it out of the front or rear loudspeakers (e.g., a front or rear transducers) near the listener. Since most drivers and passengers alike do not want to be tethered to vehicles, many vehicles use far-field microphones to capture sound and translate that sound into electrical signals. While far-field microphones effectively record utterances from the talker of interest, they also capture undesired sounds such as noise, speech from other in-car talkers, and other audio sounds created by the vehicle's loudspeakers such as music, chimes, prompts, etc. The small sizes of vehicle cabins and the driver and passenger's physical proximity to the far-field microphones also cause acoustic coupling. The feedback and echo paths between the loudspeakers and the microphones can cause howling and uncontrolled acoustic feedback. And there is noise, as shown in FIG. 1, that comes from many sources.

Figure 1:
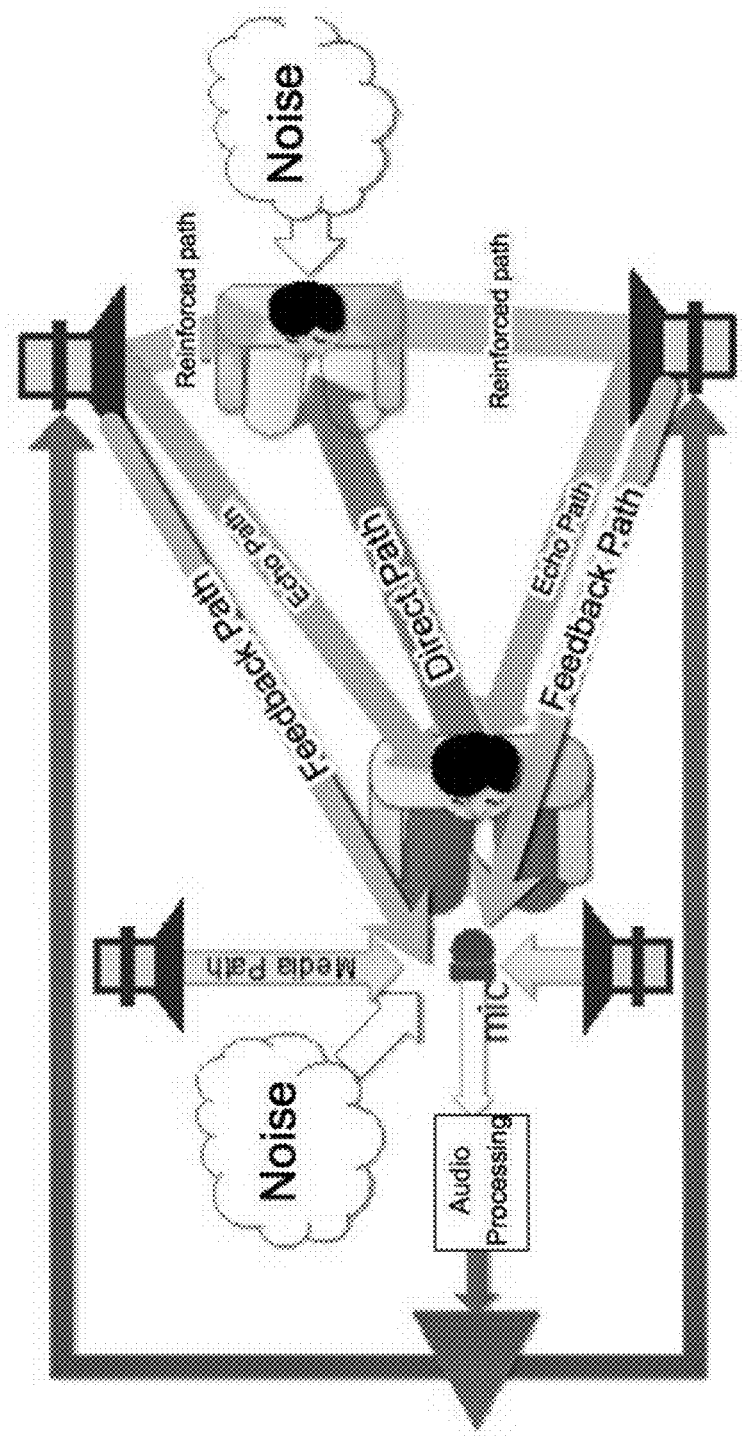
FIG. 1 is an overhead view of audio paths within a vehicle.

The acoustic processing system of FIG. 1 allows a driver's voice to be heard in the back of the vehicle even in noisy conditions. When that happens, sound can flow through the direct path and the reinforced paths at different latencies or delays that allow the listener to perceive the sound at the same time. Due to feedback and echo that accompanies the in car environment, echo and feedback cancellation is performed at the audio processor and thereafter amplified. Here, adaptive filters model the loudspeaker-to-microphone impulse responses that are executed by the audio processor to cancel echo and feedback. Feedback cancellation and echo cancellation can occur when the signals received at the microphone are decorrelated or statistically independent and distinct.

Figure 2:
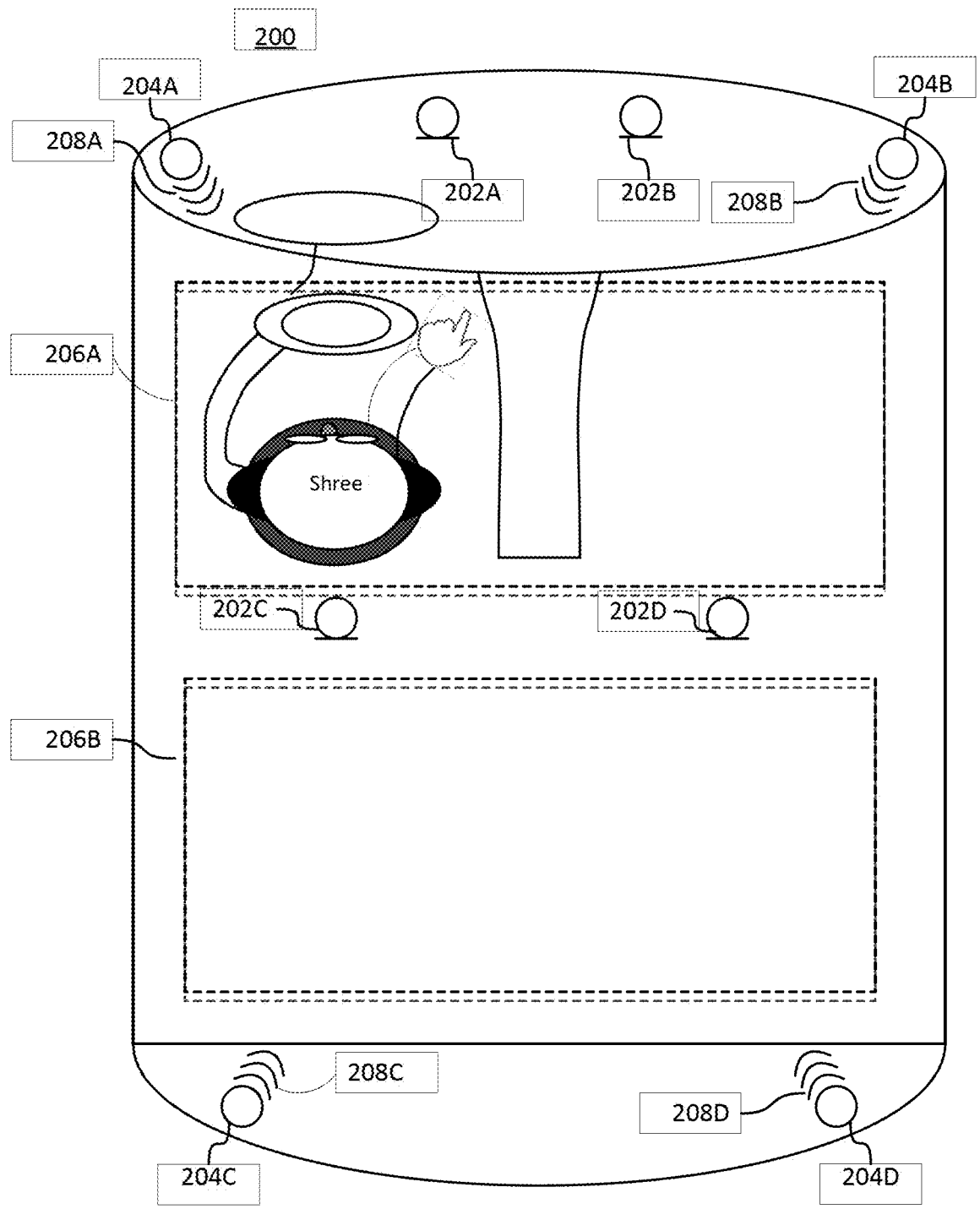
FIG. 2 is an overhead schematic view of a vehicle that includes a speech reinforcement communication system.

In FIG. 2 the audio processing system is part of the vehicle 200 and provides entertainment and echo and feedback cancellation. In other systems it is an accessory or a component of a motor vehicle and in other systems part of an audio system used in a room, which may be divided into zones. In vehicle 200 of FIG. 2, the driver and one or more co-driver's (not shown) microphone signals are captured by microphones 202 A and B and then processed and played in rear zone 206 B of the vehicle 200 through loudspeakers 204 C and D. These loudspeakers are provided with front-to-back reinforcing signals 208 C and D. Likewise, one or more rear microphone signals can be captured by microphones 202 C and D, and thereafter processed and converted into audible sound in the front zone 206 A of the vehicle 200 through loudspeakers 204 A and B if there were rear passengers communicating in the vehicle 200. These loudspeakers are provided with back-to-front re-enforcing signals 208 A and B. In FIG. 2 the driver and co-driver's (not shown) voices are reinforced for the benefit of passengers in the rear zone 206 B. This is referred to as a front-to-back reinforcement. And, if rear passengers were present, the rear passengers' voices would be reinforced for the benefit of the driver (shown here as Shree, a closet lounge singer) in the front zone 206 A. This is referred to as a back-to-front reinforcement.

In the front-to-back and in the back-to-front reinforcements, sound reflections would be further processed when reinforcement signals are received by the microphones if the sound reflections were not restrained. In the front-to-back process, for example, echo would be processed when reinforcement signals 208 C and/or D are played out of the rear loudspeakers 204 C and/or D and are picked up by the front zone microphones 202 A and/or B. If the signals were unrestrained, the echo would re-processed and rendered through loudspeakers 204 C and/or D. In this condition, the echo feeds back upon itself, and if left unchecked, would result in a ringing or a howling.

Figure 3:
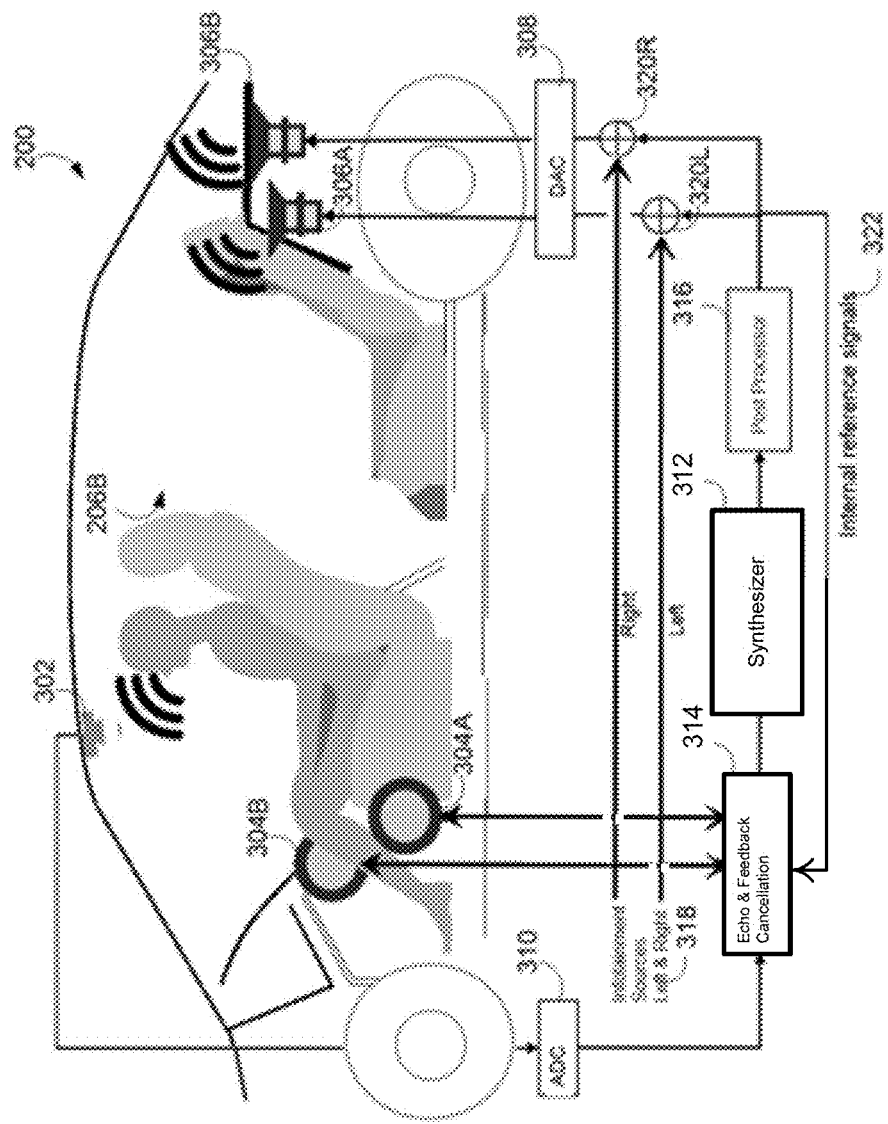
FIG. 3 is a side schematic view of an in-car entertainment communication system executing a synthesized decorrelation.

FIG. 3 is a further schematic of the acoustic processing system operating in a front-to-back reinforcement that can be further extended to a zone-to-zone reinforcement where the zones comprise a front-left (or a driver zone or zone one), a front-right (a co-driver zone or zone two), a rear left (a passenger zone behind the driver or zone three), and a rear-right (a passenger zone behind the co-driver or zone four). The acoustic processing system of FIG. 3 includes a front/driver microphone 302, two front door loudspeakers 304 A and B and two rear loudspeakers 306 A and B. The acoustic processing system within vehicle 200 also includes a digital to analog converter or DAC 308 that translates digital data into analog signals, an analog to digital converter or ADC 310 that converts continuously varying analog signals into digital data, one or more synthesizers 312 that may be real-time synthesizers that reshape sound, an echo and feedback cancellation module 314, a post processor 316, and a signal adder circuit 320 L and R. In bidirectional operation, one or more rear microphones (not shown) are used in rear zone 206 B which allows the system to process and render, if a rear passenger were present, the rear passenger's reinforced signals over the front loudspeakers 204 A and B using the process that reinforces the driver's voice in a front-to-back reinforcement. In other alternative configurations, the entertainment signals and reinforcement signals may be rendered by additional loudspeakers, e.g., tweeters or subwoofer. And, in other alternative systems the stereo infotainment source 318 shown as a two channel source may comprise one or more channels. For example, some systems within vehicles process six channels such as the six channels used in Dolby 5.1 surround sound.

In the acoustic processing system of FIG. 3, the systems models signal paths from the J loudspeakers to the M microphones. The system estimates the paths through an impulse response from loudspeaker j to microphone m,—which is $h\_j,m[n]$. The impulse response is estimated by the feedback and echo cancellation module executed by the acoustic processor. Here, "n" is the sample index. In the feedback and echo cancellation module, there are J*M echo paths, so in example vehicle 200 of FIG. 3, there are four desired signal paths in a front-to-back reinforcement starting at the front left (FL—driver) loudspeaker to the front microphone ($h\_1[n]$), from the front right (FR—co-driver) loudspeaker to the front microphone ($h\_2[n]$), from the rear left (RL—passenger behind the driver) loudspeaker to the front microphone ($h\_3[n]$) and from the rear right (RR—passenger behind the co-driver) loudspeaker to the front microphone ($h\_4[n]$). In this front-to-back reinforcement in which the reinforced signal is conveyed by a single channel and the infotainment comprises music in stereo the four loudspeaker signals, $x\_1[n], x\_4[n]$ can be represented as:

$$x\_1[n]=FL=\text{music left}$$

$$x\_2[n]=FR=\text{music right}$$

$$x\_3[n]=RL=\text{music left+reinforcement signal}$$

$$x\_4[n]=RR=\text{music right+reinforcement signal}$$

and the echo at the front microphone can be represented as:

$$E[n]=x\_1[n]*h\_1[n]+x\_2[n]*h\_2[n]+x\_3[n]*h\_3[n]+x\_4[n]*h\_4[n],$$

where '*' represents convolution in the time-domain.

In FIG. 3 echo and feedback cancellation estimates the impulse response paths $\{h\_j[n]; j=1, \ldots, J\}$ given the reference channels $\{x\_j[n]; j=1, \ldots, J\}$ and the microphone signal $Y[n]$, and then subtracts the echo $E[n]$ from microphone signal $Y[n]$. In FIG. 3, synthesizer 312, such as a real-time sound synthesizer differentiates the signals by making a non-linear modification to the reinforcing signals and/or by adding an uncorrelated signal to each channel making each of the signals unique. In an exemplary use case, the synthesizer 312 decorrelates the reinforcement signals such that the signals are perceptually similar, or in the alternative perceptually pleasing, but sufficiently different than the signal originating from the in-car talker (in FIG. 3, that the reinforcement signal derived for our driver Shree). before the signals are post-processed by an optional post processor 316. In FIG. 3, the signal adder circuit 320 L and R adds the echo cancelled audio processed signal to the infotainment signals. Because the signals are unique, the echo paths are optimally modeled by the echo & feedback cancellation module 314 that may comprise one or more instances of an adaptive filter, for example, before the signals are post-processed by an optional post processor 316.

Synthesizer 312 generates various audio effects that makes the reinforced signals unique allowing undesired echo and feedback to be removed and desired characteristics added that improve the perceived quality of the rendered signal into a professional and polished sound. For example, many of us untrained singers that do not produce a reasonably stable and consistent sound pressure level at a microphone create wildly fluctuating signals that are the amplified by loudspeakers. This problem is solved through a multi-band compressor/expander/limiter executed by the post processor 316 that dynamically adjusts the gain across different frequency bands to maintain a consistent signal level during processing and playback. The acoustic processing system can operate in the frequency-domain by converting the time domain signals into frequency domain signals through a Fast Fourier Transform (FFT), processing the rendered frequency domain sub-bands as described herein, and converting the processed frequency bands into a time domain signal through an inverse FFT. Alternative sub-bands decomposition schemes that use filter-banks, wavelets, discrete cosine transforms or related methods can also be used to implement this approach.

Other audio effects such as chorus, flange, and pitch shift may also be generated by synthesizer 312 that enhance the reinforced vocals by rendering a richer, more pleasing and professional sound. Reverberation may also be added by synthesizer 312 to render a sound that simulates an in-car talker's sound (e.g., speech, song, utterances, etc.) being reflected off of a large number of surfaces and simulating a large number of reflections that build up and then decay as if the sound were absorbed by the surfaces in a much larger and/or different space. It can provide the illusion of speaking, singing, or performing in a larger acoustic space such as a night club, concert hall, or cathedral, rather than in the small confines of the vehicle's cabin. High quality versions of these types of audio and vocal processing effects are dynamic and time variant such that the types of processing that synthesizer 312 applies, such as frequency dependent gains and delays, change over time in musically and acoustically appropriate ways. In addition, or alternatively, synthesizer 312 may imitate instruments like a piano, an organ, a harmony, flute, a guitar, vocals, a movie character such as Darth Vader (e.g., "Luke I am your father . . . "), for example; and natural sounds like ocean waves, wind, rain, etc.; or generate new electronic timbres. The time variant nature of these effects decorrelates the reinforcement signals making the signal unique, and in some instances perceptually similar but also more easily distinguishable from the original local talker's signal.

Synthesizers 312 may execute various methods to generate or morph sound. In some systems a subtractive synthesis and/or an additive synthesis may be used in real-time to dynamically reshape the sound based on the changing audio environment that can occur within the vehicle's cabin. Other acoustic processing system execute subharmonic synthesis, wavetable synthesis, frequency modulation synthesis, granular synthesis, physical modeling synthesis, phase distortion synthesis, and/or sample-based synthesis, etc.

In FIG. 3, after the signals are synthesized and the echo and feedback subtracted, an optional post-processor 316 may further process the signals to enhance sound. A post-processor 316, for example, may apply equalization and/or adaptive gain. The equalization may modify the tone color or timbre and the adaptive gain adjusts (e.g., amplifies or attenuates) the level of the reinforced signals processed by echo & feedback cancellation module 314 as a result of or in response to the level of environmental noise sensed via an in-cabin noise detector or estimated in the vehicle cabin. The adapted and equalized signal is then added to the signal sourced by the stereo infotainment source 318 through the signal adder circuit 320 L and R, respectively. Thereafter, the reinforced signal is translated into analog signals by DAC 308 and transmitted into in the rear zone 206 B by the two rear loudspeakers 306 A and B. As shown, the echo and feedback cancellation module 314 includes a closed loop 322 to adjust its output.

In another alternative system, or the systems described herein, the media level sourced by the infotainment sources 318 is measured at the adder 320, by an adder application program interface or by another sensor. Based on the measured volume levels the reinforcement of the speech or singing (e.g., the utterance) is increased relative to the measured volume levels. In some systems, the measurement is a temporally smoothed root mean square of the media signal after it is filtered by for example, a DC filter. The filter has rise and fall smoothing coefficients. In this alternative system the gain of the reinforcement signal starts to increase at one set of predetermined thresholds and stops at a maximum gain at another predetermined threshold. This ensures that the driver, occupants, or user can hear the utterance over low level music and that the performer (e.g., the active talker or singer) can hear him or herself if speaking, singing, etc. over the music or entertainment. Maximum gain may be programmed to a predetermined level, such as 5 dB level, for example. In some systems this is a dynamic level that may vary with the performer or the entertainment.

The acoustic processing system of FIGS. 2 and 3 and their alternatives process, reinforce, and enhance speech and sound naturally without distortion or added noise. The echo and feedback cancellation modules 314 of these systems execute a controlled learning processes so that the adaptive filters learn and process the loudspeaker-to-microphone impulse response signals even when the desired and undesired components of the signal are nearly identical and are occurring simultaneously. For example, in those acoustic processing systems using automated echo canceller (AEC) filters the AEC filters may not adapt to the targeted echo or reinforcement signals for brief periods in time when only the local talker is speaking meaning before the reinforcement signals are rendered over the loudspeakers. Conversely, the AEC filters may adapt during periods that only the reinforcement signal is rendered, when the local talker is not speaking. In most use cases, however, the desired and undesired components of the signals are present simultaneously (because they are produced ultimately from the same sound source), however, the decorrelation generated by the synthesizer 312 (e.g., generating the vocal and audio effects that reshape or are added to the reinforcement signals) or another differentiator alters the reinforcement signals so that different frequency portions have different levels that occur at different times or frequencies making the signals distinguishable. To ensure a proper timing, some echo and feedback cancellation modules 314 use similarity detectors such as coherence detectors or coherence signal processing to process signals between one or more of the circuits of FIG. 3 to sample the microphone signal and the reinforcement signals and adapt to the given conditions.

Figure 4:
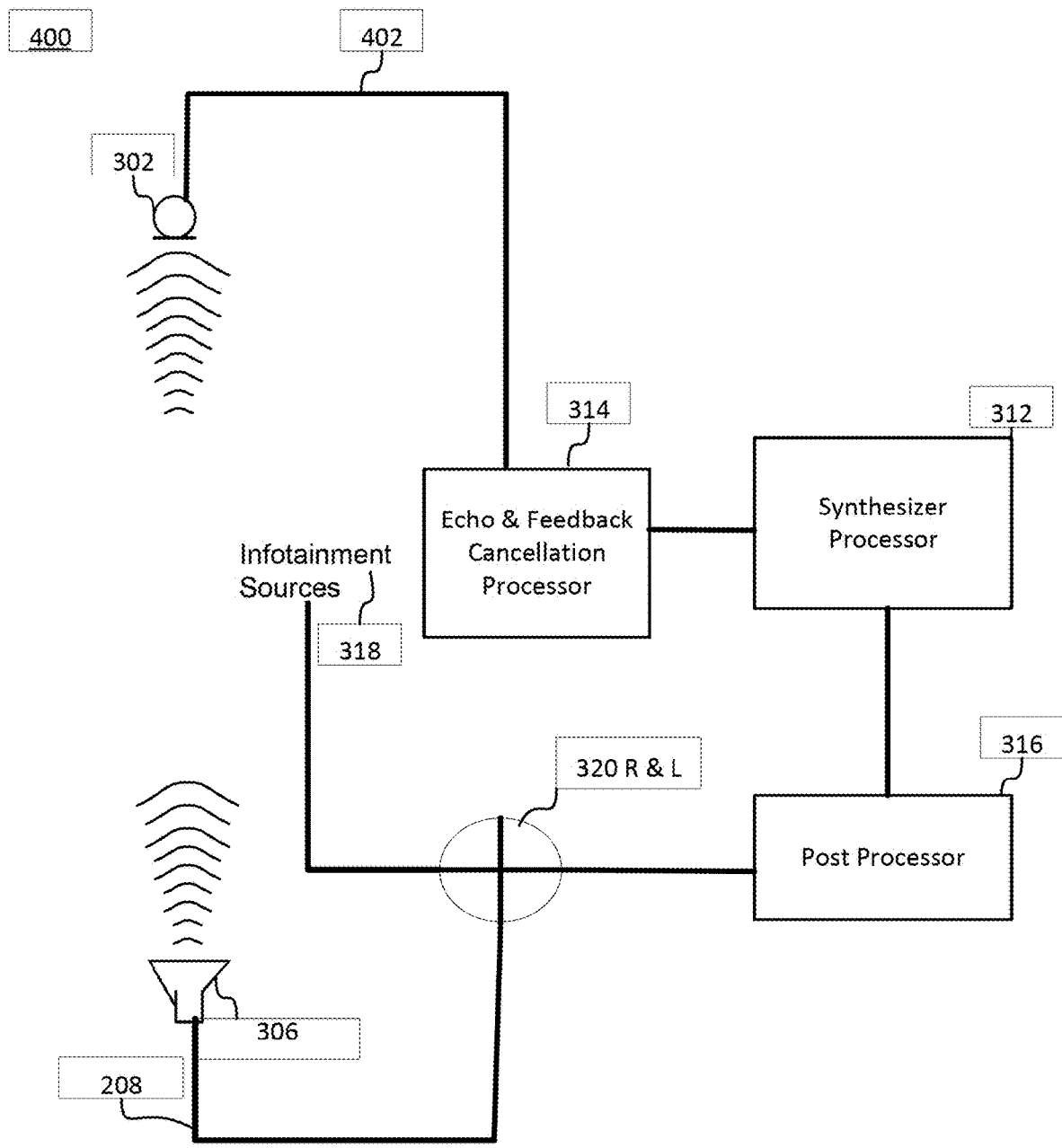
FIG. 4 is block diagram of a second in-car entertainment communication system executing a synthesized decorrelation.

FIG. 4 is a schematic representation of an entertainment in-car communication system executing a synthesized decorrelation. The system 400 is an example system for use in a vehicle. The example system configuration includes one or more microphones 302, two or more audio transducers 306, an echo and feedback cancellation processor 314, a synthesizer 312, a noise reduction and a post processor 316. The one or more microphones 302 may capture the audio signal associated with the audio source 108 and the infotainment sources 318 creating one or more captured audio signal 402. The synthesizer processor 312 generates various audio effects that makes the reinforced signals unique allowing undesired echo and feedback to be removed and desired acoustic characteristics added to the signals to improve the perceived quality of the rendered signal.

The echo and feedback processor 314 cancels feedback and echo by modeling the physical paths to the microphones. The echo and feedback processor 314 estimates the echo within the vehicle environment based on these models and subtracts the estimated echo from the signals received from the one or more microphones 302. The post processor 316 modifies the tone color and timbre of the echo cancelled and acoustically enhanced signal and the adaptive gain provided by the post processor 316 adjusts the level of the signal rendered by the echo and feedback processor 314 in response to the level of detected noise in the vehicle 200. The gains and equalization applied by post processor 316 may be adjusted in any zone or zones based on the level and color of the noise estimated in that zone or zones. So, for example, if the noise in zone one (e.g., the driver's zone) is greater than the noise in zone two (e.g., the co-driver's zone), then the gain of the signal arising from another zone, such as zone four (the passenger zone behind the co-driver) will be higher when rendered in zone one than when rendered in zone two. The adapted and equalized signal is then added to the signal sourced by the stereo infotainment source 318 through the signal adder circuit 320 L and R, respectively. Thereafter, enhanced echo reduced signal is translated into analog signals and transmitted by loudspeakers 306.

Figure 5:
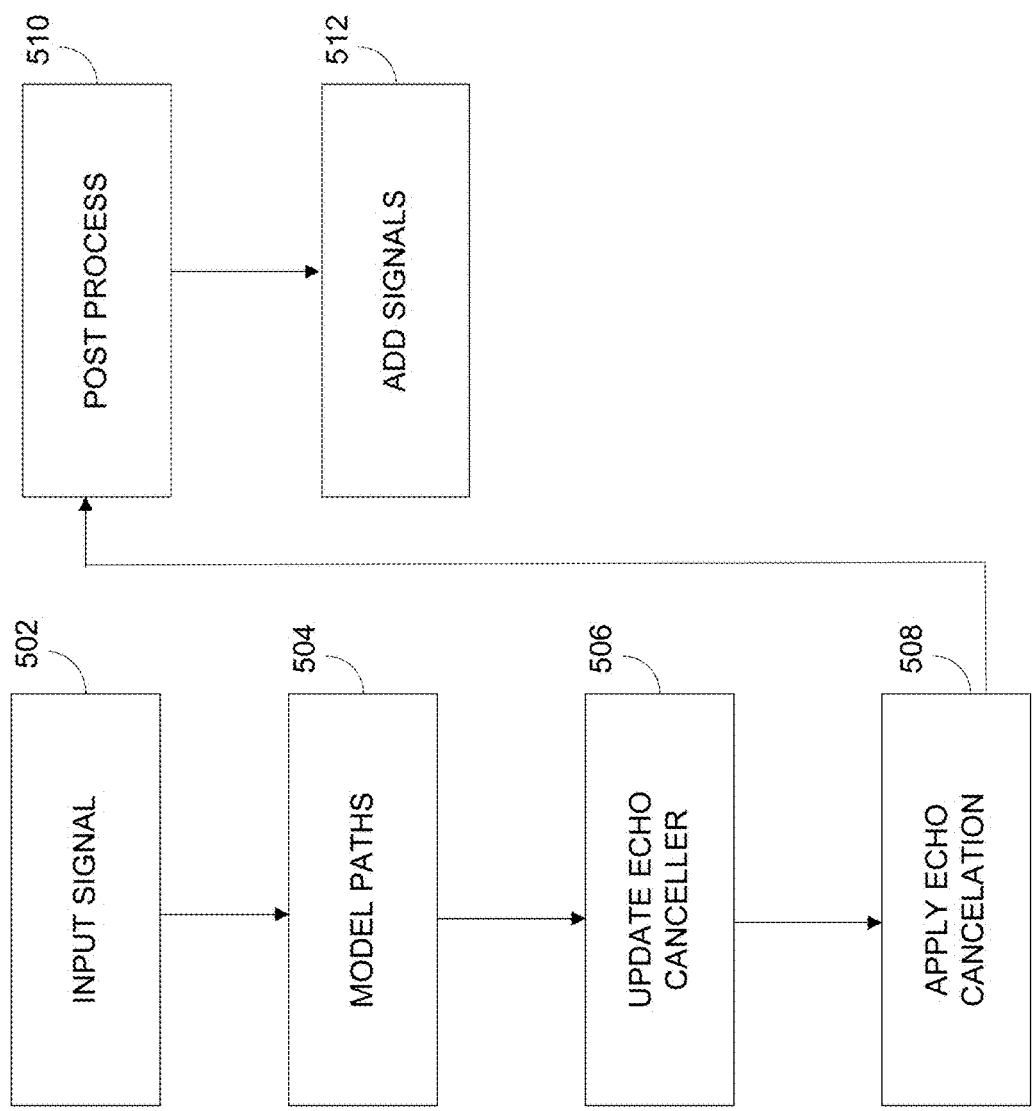
FIG. 5 is an in-car entertainment communication process executing a synthesized decorrelation.

FIG. 5 is an in-car entertainment communication process executing a synthesized decorrelation. The process may be implemented using any of the systems described herein with reference to FIGS. 1-4 and 11. The process reinforces and enhances communication by receiving the previously reinforced signal (the reinforced signal from the previous speech frame or segment) through a reinforced path and the infotainment signals at 502. At 504, the process models the acoustic environment of the vehicle by modeling the physical paths from the loudspeakers to the microphones and updates the echo canceller coefficients per each reference signal and each microphone. In a front-to-back reinforcement process modeling a stereo signal and a reinforcement signal, an exemplary process models four paths to the microphone in which the signals are decorrelated through an audio synthesizer. The echo canceller coefficients to be updated in 506 may be Finite Impulse Response (FIR) or Infinite Impulse Response (IIR) adaptive filter coefficients per each microphone and each loudspeaker. In the example described in FIG. 3 above, there are four loudspeakers and one microphone and therefore four sets of echo canceller coefficients that are updated in 506. At 508, the process calculates or estimates the contributed echo from each of the loudspeakers and subtracts it from the signal received at the microphone. When an optional adaptive gain and/or equalization is applied at optional acts 510 the process modifies the tone color and timbre and an adaptive gain adjusts the level of the signal rendered by act 508 in response to the level of detected noise in the vehicle. The adapted and equalized signal may then be added to the signals sourced by an infotainment source at 512.

Figure 6:
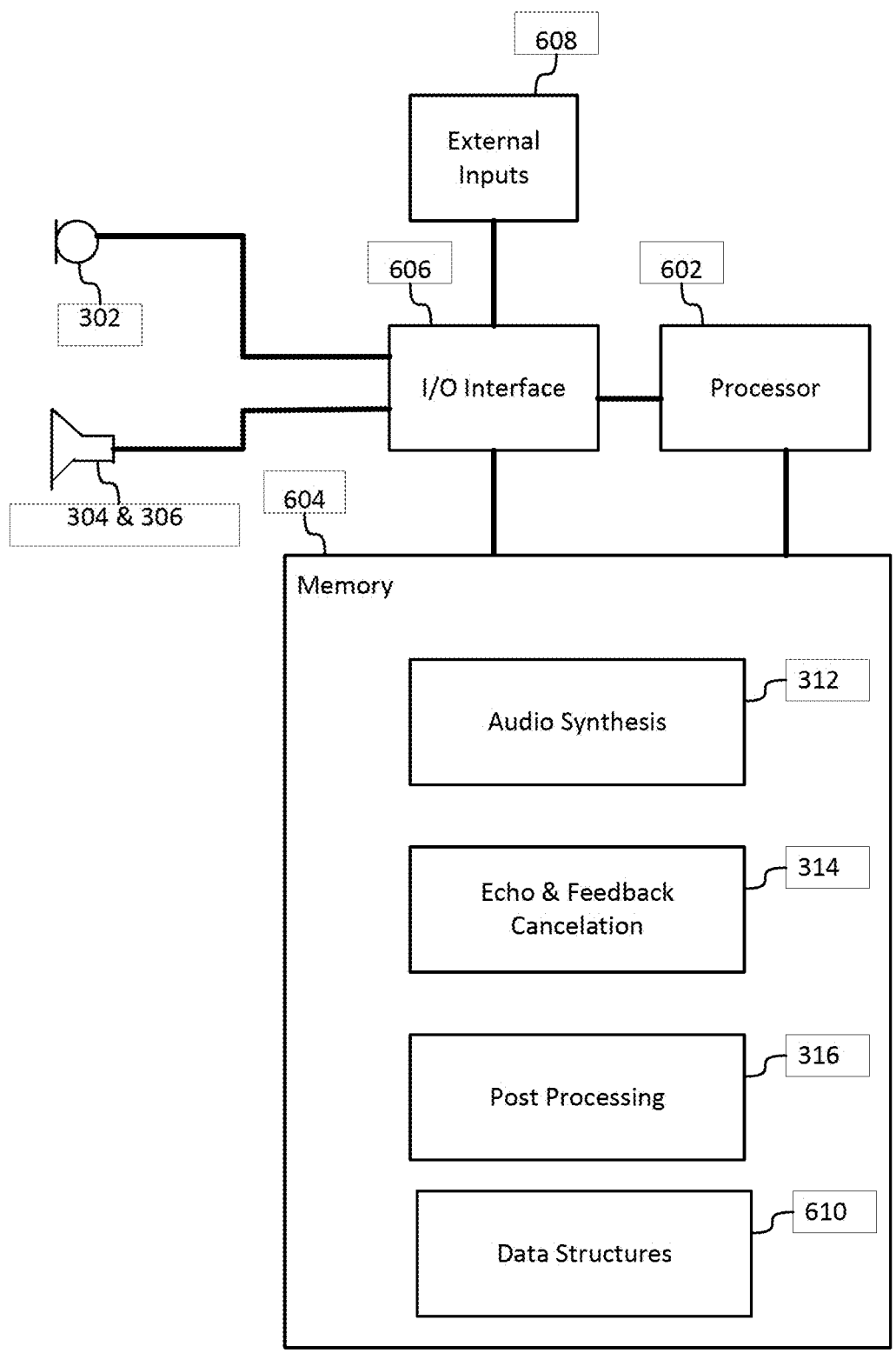
FIG. 6 is a block diagram of a third in-car entertainment communication system executing a synthesized decorrelation.

FIG. 6 is a block diagram of a third in-car entertainment communication system executing a synthesized decorrelation. The system comprises a processor 602, a non-transitory media such as a memory 604 (the contents of which are accessible by the processor 602) and an I/O interface 606. The I/O interface 606 that may be used to connect devices such as, for example, additional microphones, audio transducers or loudspeakers, and receive external inputs 608 from other local or remote sources. The memory 604 may store instructions which when executed by the processor 602 causes the system to render some or all of the functionality associated with the in-car entertainment communication system as described herein. For example, the memory 504 may store instructions which when executed by the processor 602 causes the system to render the functionality associated with audio synthesis 312, echo and feedback cancellation 314, and the optional post processing 316. In addition, data structures, temporary variables and other information may store data in the memory 504.

Alternative systems and processes to those shown in FIGS. 3-11 apply reverberation (and pitch shift) and/or various audio effects that makes the reinforced signals unique through the post processor 316 or through the post process 510. In these alternative systems the post processor 316 and the post process 510 act decorrelate the reinforcement signal from the original microphone signal such that only the reinforcement signal is "mutated" or processed by the time-variant and/or frequency shifting effects as described in this disclosure. The post-processed signal is added to the infotainment content if there is any and rendered over the loudspeakers. The alternative systems and processes also feed-back as an internal reference signal, such as the reference signal 322 to the echo and feedback cancellation shown in FIG. 3. The synthesizer effects described herein, such as adding drum or guitar sounds from simulated "air drums/air guitar", for example, is also applied through the post processor 316 and/or post process 512.

In yet another alternative not all media is rendered through loudspeakers. In some instances, output is rendered through headphones or other devices that do not bleed sound into other zones of the vehicle cabin. In these use cases echo cancellation and audio synthesis may not be applied to the content rendered in these isolated zones in some systems, in other systems, a synthesized signal is added to the original microphone signal to simulate the audio environment in the isolated zones.

Figure 7:
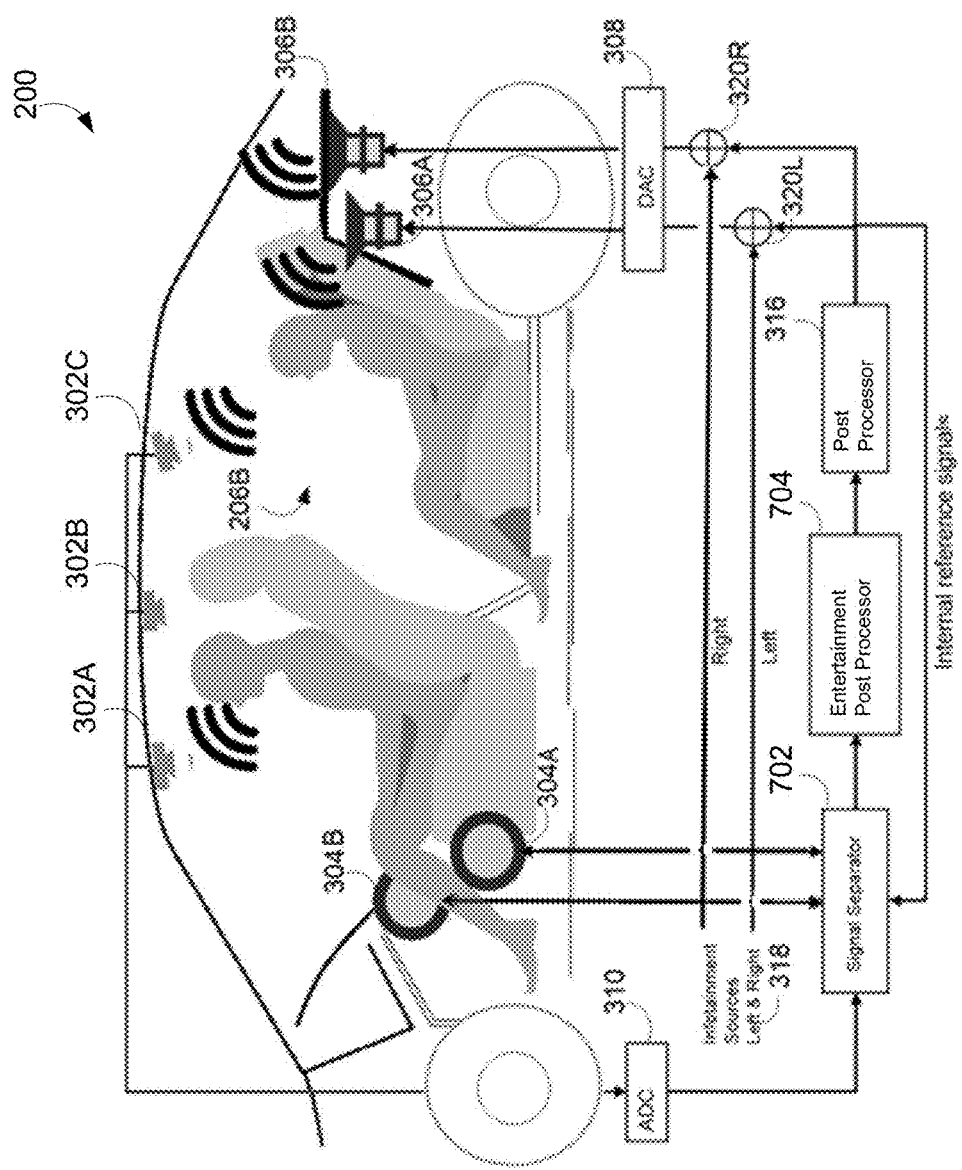
FIG. 7 is a side schematic view of an in-car entertainment communication system executing a multi-zone cancellation.

FIG. 7 is a side schematic view of the vehicle of an entertainment in-car communication system executing multi-zone interference cancellation. In the multi-zone interference cancellation, microphones are positioned near each occupant whose voice is of interest. For example, in a vehicle with three occupants, such as the vehicle 200 shown in FIG. 7, (a driver, a co-driver that is hidden, and a single rear-seat passenger) there will be three or more microphones 302 A through C placed such that each of the microphones 302 A through C ideally capture only a single and different talker. In vehicles with four occupants, there are four or more microphones (e.g., the number of microphones will be equal or be greater than the number of talkers) or in the alternative, may be less when the systems use one or more beamforming microphone arrays that steer the pickup patterns of each of the talking occupants, and in some instances, further reject unwanted noise and echo. In some systems, the microphones reject all of the undesired talkers. In other systems, microphones such as microphones 302 A through C of FIG. 7, capture sound from some of the undesired talkers. In FIG. 7, a multi-zone interference cancellation uses a signal separator 702 made up of adaptive filters to model the talker-to-microphone impulse responses that estimate the undesired talker's signals and render signals that subtract the voices of the undesired talkers from the microphone signals to isolate the desired talker's utterances.

As an example, suppose that the desired signals to be preserved are sourced from the driver (referred to as the desired talker), and the undesired signals that are to be eliminated are sourced from the other occupants (referred to as the undesired talkers). In this use case, the interference signals are the microphone signals sourced from locations other than the driver (i.e., the co-driver and the left rear passenger). These interference signals are convolved with their own adaptive filters rendering separate models for each of the undesired talkers that together produce estimates of all of the undesired signals that are subtracted from the composite driver's microphone signal, which results in isolating the driver's signal or substantially isolating it. In this example the microphones are positioned such that the microphone or microphones positioned nearest a talker generate the loudest signal of that talker, thus providing a reference signal for identifying each of the talkers in a given composite signal. Because vehicle cabins are a confined space, and all the occupants share the same acoustic environment, the desired signal, the driver's voice in this example, may also be captured by the other microphones 302 B and C such that the reinforcement signals processed by the other adaptive filters are contaminated with a slightly attenuated and delayed version of the driver's voice. If these adaptive filters don't adapt properly, the system will subtract the estimated signals too aggressively and eliminate the desired signals; or in the alternative, be too permissive and allow too much of the undesired signals to pass through to the vehicle cabin. As a result, the entertainment in-car communication system of FIG. 7 executes a controlled learning processes so that its adaptive filters model the talker-to-microphone or the microphone-to-microphone impulse response rather than loudspeaker-to-microphone impulse responses described in the front-to-back and back-to-front reinforcements described in FIGS. 1-6. The adaptive filters model the microphone-to-microphone impulse response even when the desired and undesired components of the signals are nearly identical and occur simultaneously. When using adaptive filters, such as an adaptive filter from microphone 304A to microphone 304B, the adaptive filter 304A to 304B adapts whenever the signal on microphone 304A is louder (by a predetermined threshold) than the signal on microphone 304B (per a given frequency signal or frequency band), and if the signal on both microphones is above their respective estimated noise. The system need not figure out who may be talking or when they stopped talking. In this application, even when two zones contain speech or talking, both adaptive filters (e.g., adaptive filter 304A to 304B and adaptive filter 304B to 304A) can adapt because one adaptive filter may detect high amplitude signals in the low frequencies, while the other adaptive filter may detect high amplitude signals in the high frequencies. To ensure proper timing, some signal separator modules 402 use similarity detectors that process signals sampled in the vehicle cabin such as coherence detectors or coherence signal processors that process the relationship between the signals and reports the relationship to the signal separator 402. The coherence detectors or coherence signal processors may process signals sampled from the desired talkers and the undesired talkers to differentiate the signals and provide timing for the adaptive filters to adapt to their targeted signals for the given conditions. Further, each undesired talker's signal may be differentiated from other signals in the vehicle 200 by convolving the desired talker's signal with its own adaptive filter rendering the desired talker's model. The desired talker's model and the previously rendered undesired talker models not associated with the undesired signals to be isolated produce estimates of the other undesired signals and the desired signals. The sum of these estimates are then subtracted from the composite undesired microphone signal associated with the undesired talker to be isolated (the composite signal having the loudest signal of that undesired talker), which isolates that undesired talker's signal or substantially isolates it.

In FIG. 7, an entertainment post processing system 704 may deliver entertainment, services, or a grammar-based or a natural language-based automatic speech recognition (ASR). Since the in-car entertainment communication system isolates speech and/or other content delivered in the vehicle 200 a parallel architecture through a tree-based ASR structure may execute speech recognition of a limited vocabulary size through one or more processing branches (or paths) when resources are limited or through an unlimited vocabulary through a natural language vocabulary that can include a dictionary in one or more or all processing branches or a combination of ASRs. The recognition results of the larger vocabulary ASRs and/or remote ASRs may be normalized with domain specific grammars in their respective processing branches. Word selections may occur based on a likelihood calculation, confidence level, or confidence score (referred to as a confidence score) that may be preserved in ASR metadata. When the highest likelihood or confidence score exceeds a predetermined or contextual threshold, an alignment system within the ASR may identify the spoken utterance and classify the spoken utterance as correctly recognized. The ASR results and the ASR metadata may be transmitted locally in the vehicle or transmitted from the vehicle to remote systems, devices, or applications.

A grammar-based or natural language based ASR engine that can comprise the digital post processing system 404 captures the speech signal by processing frames of speech input in real-time or after a programmed delay. An acoustic modeling, feature extraction, and normalization that match the sound parts of the input signal against the vocabularies are retained in a data store or memory. While the memory or data store may be a unitary part of a local grammar-based ASR engine, the data store may reside in a local or distributed memory, in a cloud, or a local or distributed database.

A vocabulary application program interface that is communicatively coupled to digital post processing system 404 or is a unitary part of it, may provide access to all of the data needed to recognize speech. In some systems it may include one or more language models, acoustic models, word dictionaries, speaker profiles, etc. that may be accessed by the any of ASR engines through a vocabulary translator. A control application program interface coupled to the ASRs may provide the ASRs with access to speaker specific data, such as a speaker's address book or speaker's profile for example, and dynamic speaker specific data that may be translated into active grammars. A speech-to-text (STT) synthesis by an output translator coupled to the ASRs may translate the recognition output of the grammar-based or natural language based ASR engines into text that may interface a local or remote short-message-service (SMS) system or application that transmits the text messages through an output interface of the digital post processing system 404 from the vehicle 200 through a local or remote wireless network to a remote wireless device.

Besides isolating sound, rendering text, and enabling occupants to simultaneously send text messages from the vehicle 200, the recognized speech results may be processed by one or more gaming system, too. For example, the digital post processor 404 may execute a game application such as a "question and an answer" process that renders a quiz like game show competition. In one application the infotainment sources 318 present questions or clues in the form of answers in which occupants must enunciate answers (if posed as a question) or phrase their responses as questions (if posed as answers) through speech. The entertainment post processor 704 processes each of the occupants' separate responses through separate ASR engine instances running concurrently and determine which of the occupants answered the question correctly, and in some instances, in what order. In some applications, the digital post processor 404 converts all of the answers it processes into text and/or synthesized audio, and transmits the visual answers and/or synthesized audio to a heads-up-display in the vehicle 200 and/or the loudspeakers 304 A and B and/or 306 A and B in the vehicle 200. The correct responses, the answers or the questions, the order that they were given and other information associated with it may be rendered through the vehicle's in-car system or transmitted to the occupants' wireless and/or mobile devices and players' scores tracked and similarly reported by the entertainment post processor 704.

In yet another application, the entertainment post processor 704 may execute synthesis signal processing that modifies the isolated speech from the multiple zones of the vehicle—where the zones comprise a front-left (or driver zone—zone one), front-right (co-driver zone or zone two), rear left (a passenger zone behind the driver or zone three), and rear-rear right (a passenger zone behind the co-driver—zone four). In this application the synthesis signal processing modifies the isolated voices coming from the different zones or alternatively, each of the occupants and modifies the spoken utterances before rending them through selected loudspeakers. The modification may occur by pitch shifting the audio of each zone and then rendering the processed utterances in different zones or combinations of zones out of selected loudspeakers. For example, the front-right zone may be pitch shifted up a half of an octave and projected into the vehicle cabin through rear loudspeaker 306 A, the front-left zone may be pitch shifted up two tenths of an octave and projected into the vehicle cabin through rear loudspeaker 306 B, the rear right zone may be pitch shifted up eight tenths of an octave and projected into the vehicle cabin through front loudspeakers 304 A and B, and the rear-left zone may be pitch shifted up an octave and projected into the vehicle cabin through front and rear loudspeakers 304 A and B and 306 A and B to render an in car harmony.

In an alternate entertainment in-car communication system, the signal separator 402 automatically separates and/or isolates the vocal track from the infotainment content such as the music that is to be played within the vehicle 200 in real-time or after a delay. The grammar-based and/or natural-language based ASR engines process the vocal track so that the lyrics are automatically recognized. In some in-car entertainment communication system that may include the functions shown in FIG. 7, the speech recognized lyrics are stored locally in memory or in a cloud-based storage as metadata with the original music or the processed music (with and/or without the original vocal tracks) so that the processing need only occur once a music track or segment is played. When the content is rendered, the original music or the track without vocals may be rendered in the vehicle cabin through loudspeaker 302 A and B and 306 A and B. The lyrics may be displayed on one or more heads-up display for each of the occupants or transmitted to the occupants wireless or mobile devices. In these alternatives a carpool karaoke system is rendered.

Figure 8:
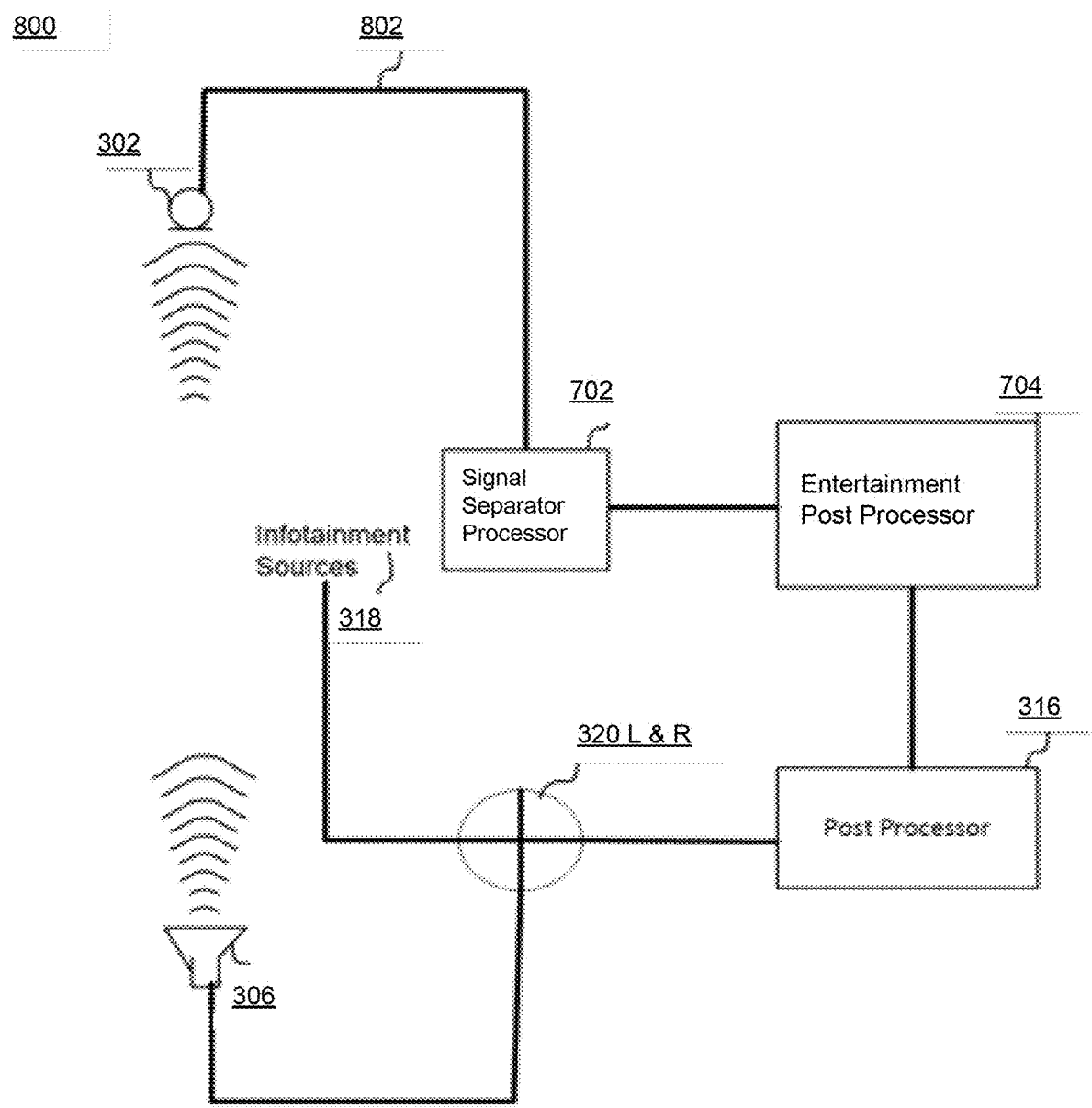
FIG. 8 is block diagram of a second in-car entertainment communication system executing a multi-zone cancellation.

FIG. 8 is block diagram of a second in-car entertainment communication system executing multi-zone cancellation. The system 800 is an example system for use in a vehicle. The example system configuration includes one or more microphones 302, two or more audio transducers 306, a signal separator processor 702, an entertainment post processor 704, and a post processor 316. The one or more microphones 302 may capture the audio signal rendered by the audio transducers 306 A and B, and the infotainment sources 318, creating one or more captured audio signal 802. The signal separator processor 702 models the talker-to-microphone impulse responses paths that estimate the undesired talker's signals and render signals that subtract the voices of the undesired talkers from the microphone signals to isolate the desired talker's utterances. In an entertainment context the signal separator processor 702 models the vocal tracks that estimate the performer's signals and render signals that subtract the performers' signals from the original content to isolate the performers' content from the remaining content. The entertainment post processor 704 deliver entertainment, services, and/or a grammar-based or a natural language-based automatic speech recognition. The post processor 316 modifies the tone color and timbre of entertainment post processor signal and the adaptive gain adjusts the level of the reinforced signal rendered by the post processor 316 in response to the level of detected noise in the vehicle cabin. The adapted and equalized signal is then added to the signal sourced by the infotainment source 318 through the signal adder circuit 220 L and R, respectively. Thereafter, the processed signal is translated into analog signals and transmitted by loudspeakers. One or more optional enhancements described above may also be executed.

Figure 9:
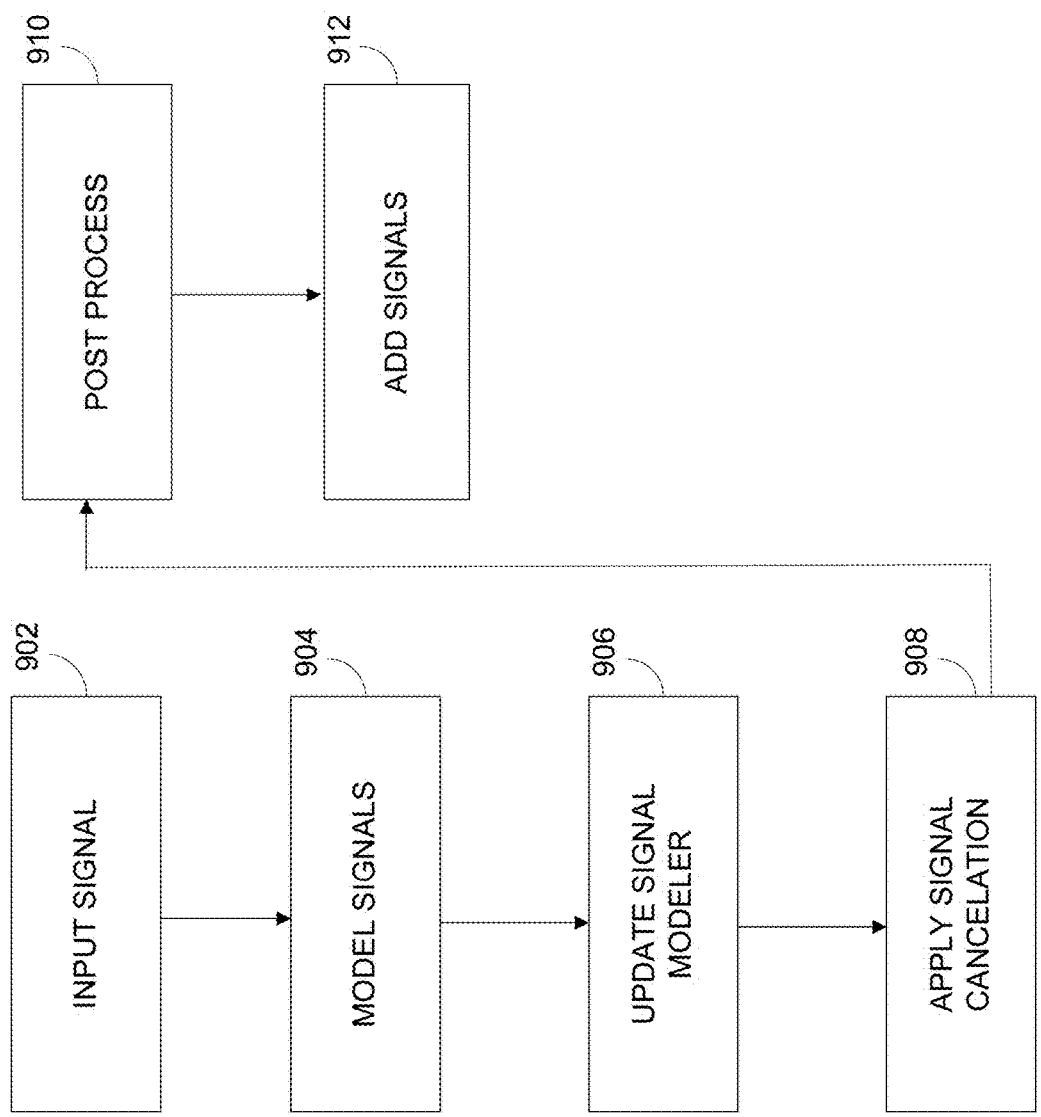
FIG. 9 is an in-car entertainment communication process executing a multi-zone cancellation.

FIG. 9 is an in-car entertainment communication process executing a multi-zone signal cancellation. The process may be implemented using any of the systems described herein with reference to FIGS. 7, 8, and 10. The process isolates a desired talker's spoken utterances by receiving the undesired talker's speech and the infotainment signals at 902. At 904, the process models the acoustic environment of the vehicle by modeling the talker-to-microphone impulse responses that estimate the undesired talker's signals, and updates the adaptive filter coefficients per each undesired talker and each microphone. In a front-to-back isolation process modeling three occupants to a single microphone, an exemplary process models the undesired talker-to-microphone impulse responses of a prior speech or local source segment. The adaptive filter coefficients to be updated in 906 may be a Finite Impulse Response (FIR) or Infinite Impulse Response (IIR) adaptive filter coefficients per each microphone and each undesired talker's signals. In the example described above, there are two undesired talker signals, one microphone and therefore three sets of adaptive filter coefficients that are updated in 906. At 908, the process calculates or estimates the contributed signal from each of the undesired talker sources and subtracts it from the signal received at the microphone. At 910 an optional post processor 910 modifies the tone color and timbre and an adaptive gain adjusts the level of the signal rendered by act 908 in response to the level of detected noise in the vehicle 200. The adapted and equalized signal may then be added to the signals sourced by an infotainment source at 912.

Figure 10:
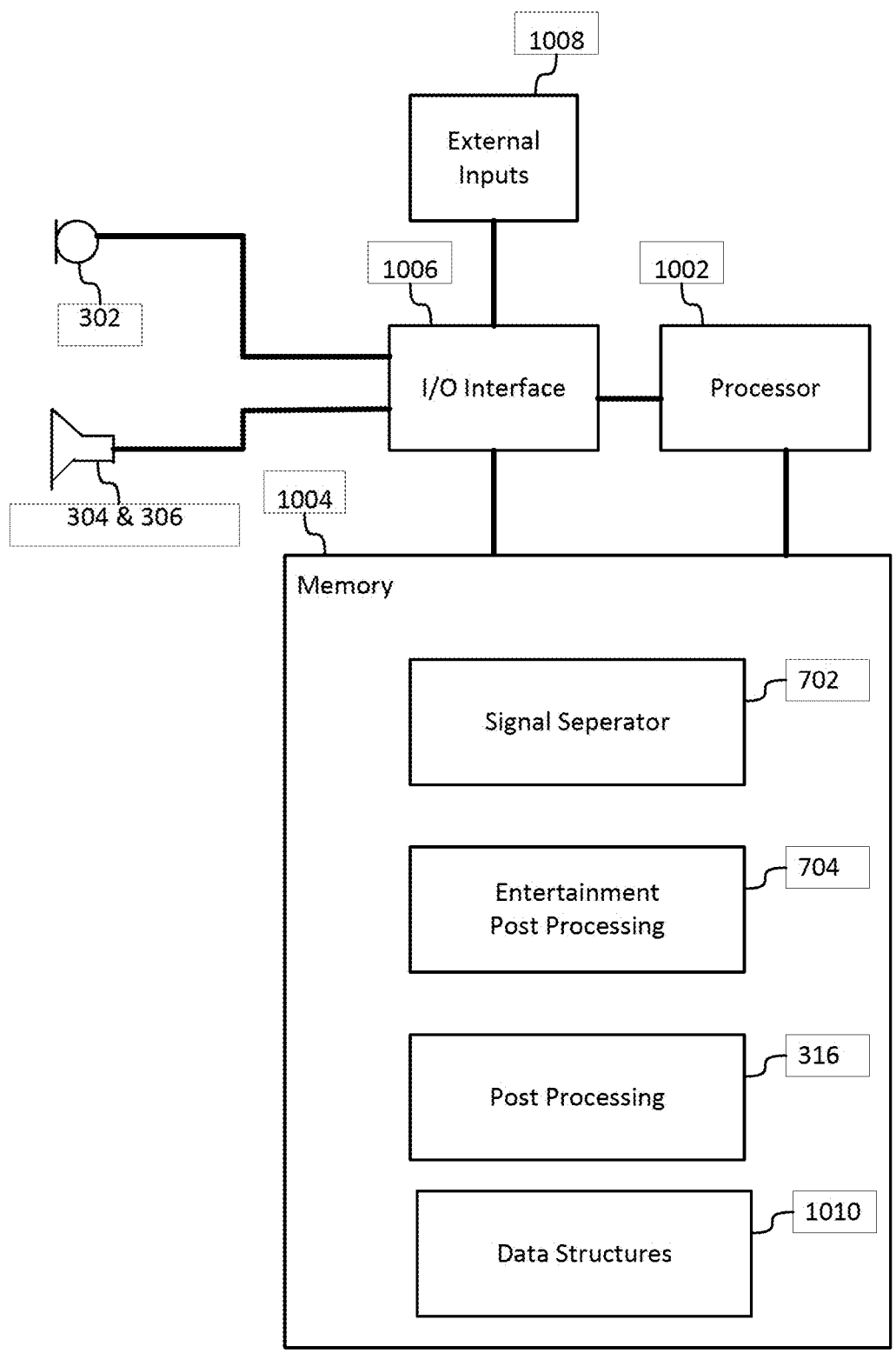
FIG. 10 is a block diagram of a third in-car entertainment communication system executing a multi-zone cancellation.

FIG. 10 is a block diagram of a third in-car entertainment communication system executing a multi-zone cancellation. The system comprises a processor 1002, a non-transitory media such as a memory 1004 (the contents of which are accessible by the processor 1002) and an I/O interface 1006. The I/O interface 1006 may be used to connect devices such as, for example, additional microphones, audio transducers or loudspeakers, and receive external inputs 1008 from other local or remote sources. The memory 1004 may store instructions which when executed by the processor 1002 causes the system to render some or all of the functionality associated with signal isolation described herein. For example, the memory 1004 may store instructions which when executed by the processor 1002 causes the system to render the functionality associated with signal separation and isolation 702, entertainment and speech recognition post processing 704, the optional post processing 316. In addition, data structures, temporary variables and other information may store data in memory 1004.

Figure 11:
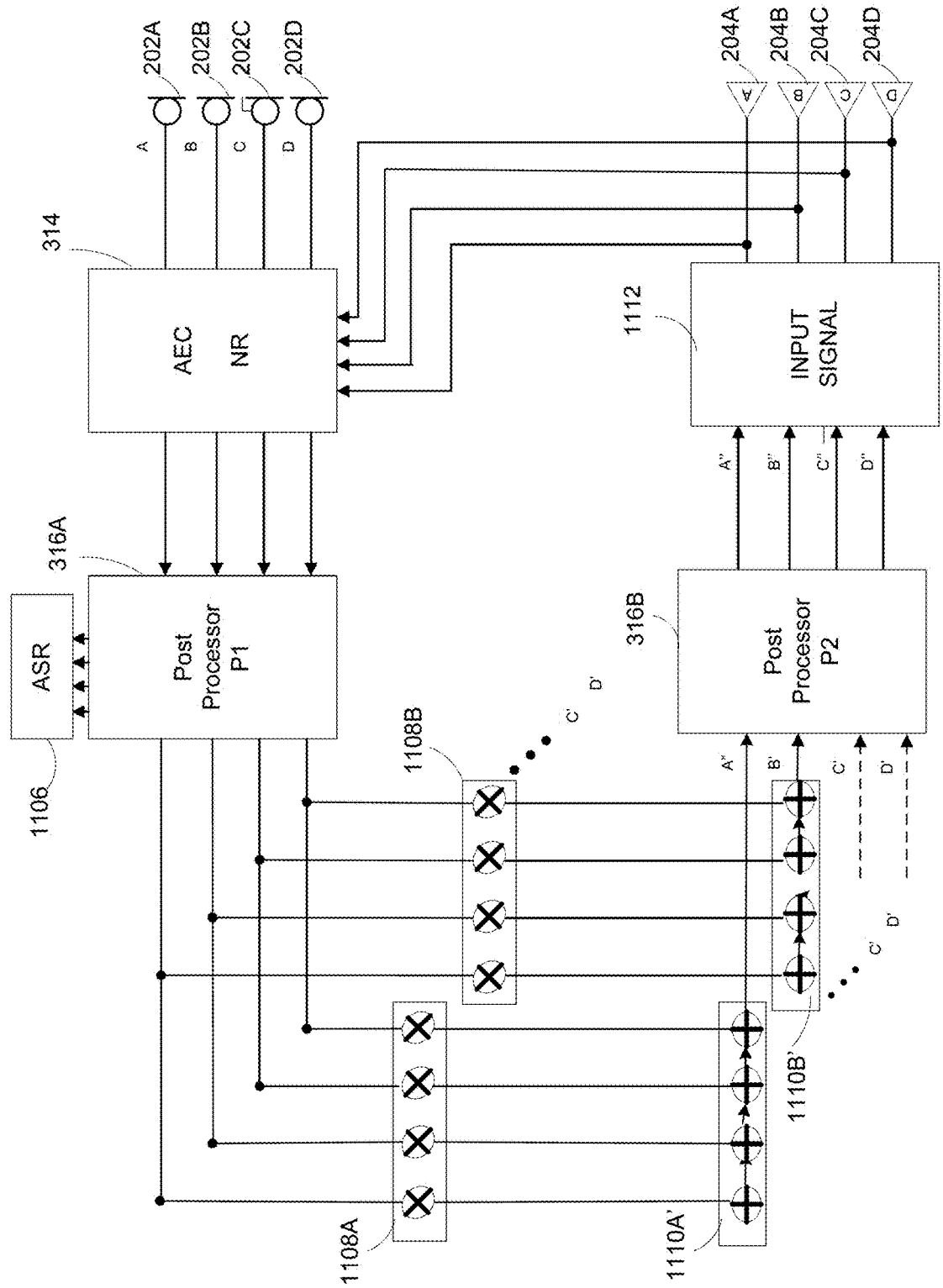
FIG. 11 is a block diagram of a third in-car entertainment communication system executing a synthesized decorrelation.

FIG. 11 is a block diagram of a third in-car entertainment communication system executing a synthesized decorrelation in multiple stages. The example configuration includes multiple microphones 202 A-D positioned in separate zones, an echo and feedback cancellation module 314, multiple post-processors 316 A and B, a grammar-based and/or a natural language-based ASR 1106, automatic gain adjusters 1108 A-D (C and D are not shown) that may adjust a signal by multiplying by a factor between zero and one, signal summers 1110 A'-D' (C' and D' are not shown), signal summer(s) 1112 and transducers 204 A-D, each of the transducers are positioned in separate zones.

In FIG. 11, signals are coming into and out of zones—where the zones comprise a front-left (or driver zone—zone one), front-right (co-driver zone or zone two), rear left (a passenger zone behind the driver or zone three), and rear-rear right (a passenger zone behind the co-driver—zone four) of a vehicle. The signals going into the zones are a composite of the signals coming out of zones added to the infotainment and in-car media (e.g., zone 1=zone 2+zone 3+zone 4+infotainment/in-car media, which may or may not have been panned, faded, or otherwise spatialized). In FIG. 11 there are two additive blocks; the first block is the first post processor 316 A or post processor instance and the addition that renders the first sum of the zones (e.g., Z1=Z2+Z3+Z4) that occurs through signal adders 1110 A', 1110 B', 1110 C', and 1110 D' (1110 C' and D' are not shown). The second block is the processing that occurs after the first sum. The second block is where that composite signal rendered by the first block is subject to post processor 316 B or the second post processor instance and input signal adder 1112 that adds post-processed signals A" through D" to infotainment or in-car media through signal summer(s) 1112.

In FIG. 11 any combination of the post processors or post processing described in this disclosure may be executed before and/or after the first sum. If executed before the first sum, the system may execute processing that may be directed to a specific occupant or group of occupants of one or more zones (e.g., through voice morphing, normalizing with a compressor, an automatic speech recognition 1106, etc.), and if executed after the first sum the system may process the composite signal A' through D' for the benefit of one or more listeners in a specific zone or zones (e.g., executing a noise-dependent equalization and/or gain adjustment, for example). Similarly, some system may mute one or more zones before or after the first sum, meaning the system can mute the contribution from one or more particular zones, block all of the zones, or not generate one or more reinforcement signals that would be transmitted into one or more particular zones. Such a process may occur when a predetermined event occurs such as when a private call is received or placed in one or more zones.

The processors 312-316, 602, and/or 1002 may comprise a single processor or multiple processors that may be disposed on a single chip, on multiple devices or distributed over more than one system. The processors 312-316, 602, and/or 1002 may be hardware that executes computer executable instructions or computer code embodied in the memory 604 and/or 1004 or in other memory to perform one or more features of the systems described herein. The processors 312-316, 602, and/or 1002 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 604 and/or 1004 or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 604 and/or 1004 may comprise a single device or multiple devices that may be disposed on one or more dedicated memory devices or on a processor or other similar device. When functions or steps are said to be "responsive to" or occur "in response to" a function or a process, the device functions or steps necessarily occur as a result of the function or message. It is not sufficient that a function or act merely follow or occur subsequent to another. Further, when functions indicate an echo cancellation, echo is removed by subtracting an estimated echo from the transmitted or received signal.

The memory 604 and/or 1004 may also store computer code, executable by the synthesis processor 312, the echo and feedback cancellation processor 314, the post processor 316, the signal separator processor 702, the entertainment post processor 704, as described herein. The computer code may include instructions executable with the processors 312-316, 602, and/or 1002. The computer code may be written in any computer language, such as C, C++, assembly language, channel program code, and/or any combination of computer languages. The memory 604 and/or 1004 may store information in data structures including, for example, feedback and or echo canceller coefficients that render or estimate echo signal levels.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The system and process reinforces speech and enhances it without distortion or added noise in a vehicle. A vehicle may comprise, without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things.

The system and process is fully automated such that the amount of reinforcement is continuously adapted to the actual echo and noise level estimated within the vehicle cabin and the signal isolation is adapted to the actual talkers in the vehicle. So as different noise conditions are experienced, the reinforcement, isolation, and entertainment is immediately and smoothly adjusted and the occupants do not need to operate any controls at all. The system eliminates howl and the unpleasant perceptible effects of echo and provides active signal enhancements and entertainment in the car and transmitted to local or remote wireless devices or mobile phones. It operates at low delay. The system can be implemented on or within other car systems such as an infotainment processor and digital signal processors or DSPs and co-exist and communicate with other system software. The system is easy and quickly adapted to different vehicle and cabin types and different acoustic environments configurations.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A method that enhances voice through reinforcement in an in-car communication (ICC) system, comprising:
    reproducing a reinforcement signal of a voice of a user in each zone in a subset of zones in a plurality of zones of an acoustic environment, wherein the reinforcement signal is reproduced by at least one speaker in each zone in the subset of zones, wherein the reinforcement signal reproduced in each zone in the subset of zones comprises the voice of the user enhanced by adding a reverberation via a non-linear modification made to a processed audio signal or an uncorrelated signal added to the processed audio signal so that the reinforcement signal for each zone is unique, wherein the subset of zones being back zones of the acoustic environment for a front-to-back reinforcement or front zones of the acoustic environment for a back-to-front reinforcement;

capturing a microphone signal for each microphone in a plurality of microphones contemporaneously with reproducing the reinforcement signal in each zone in the subset of zones, wherein at least one microphone is located in each zone in the plurality of zones of the acoustic environment;

estimating a plurality of echo paths from each speaker in the plurality of zones of the acoustic environment to each microphone in the plurality of microphones;

decorrelating, via a synthesizer of the ICC system, the reinforcement signals from the microphone signals in accordance with the plurality of echo paths and the reverberation of the reinforcement signal reproduced in the respective zone to generate decorrelated microphone signals that are unique;

generating processed audio signals by removing echo contributions of each of the plurality of echo paths from the decorrelated microphone signals;

generating, via the synthesizer of the ICC system, further reinforcement signals from the processed audio signals that enhance the voice of the user in the processed audio signals for each zone in the subset of zones, the further reinforcement signals being generated for each zone in the subset of zones in the plurality of zones in the acoustic environment, the further reinforcement signals for each zone in the subset of zones comprising the voice of the user enhanced by adding a reverberation via a non-linear modification made to the processed audio signal or an uncorrelated signal added to the processed audio signal so that each further reinforcement signal is unique; and reproducing the further reinforcement signal in each zone in the subset of zones, wherein the further reinforcement signal in each zone in the subset of the zones is reproduced by the at least one speaker in each zone of the subset of zones.

2. The method of claim 1, wherein generating the further reinforcement signals, by the synthesizer of the ICC system, comprises dynamically adjusting the gains of the processed audio signals for each zone in the subset of zones.

3. A non-transitory machine-readable medium encoded with machine-executable instructions, wherein the machine-executable instructions, in response to execution by a processor of an in-car communication (ICC), cause the processor to:

cause a reinforcement signal of a voice of a user to be reproduced in each zone in a subset of zones in a plurality of zones of an acoustic environment, wherein the reinforcement signal is reproduced by at least one speaker in each zone in the subset of zones, wherein the reinforcement signal reproduced in each zone in the subset of zones comprises the voice of the user enhanced by adding a reverberation via a non-linear modification made to a processed audio signal or an uncorrelated signal added to the processed audio signal so that the reinforcement signal for each zone is unique, wherein the subset of zones being back zones of the acoustic environment for a front-to-back reinforcement or front zones of the acoustic environment for a back-to-front reinforcement;

cause a microphone signal to be captured for each microphone in a plurality of microphones contemporaneously with reproducing the reinforcement signal in each zone in the subset of zones, wherein at least one microphone is located in each zone in the plurality of zones of the acoustic environment;

cause a plurality of echo paths to be estimated from each speaker in the plurality of zones of the acoustic environment to each microphone in the plurality of microphones;

cause the reinforcement signals to be decorrelated, via a synthesizer of the ICC system, the reinforcement signals from the microphone signals in accordance with the plurality of echo paths and the reverberation of the reinforcement signal reproduced in the respective zone from which the respective microphone signal was captured to generate decorrelated microphone signals that are unique;

cause processed audio signals to be generated by removing echo contributions of each of the plurality of echo paths from the decorrelated microphone signals;

generating, via the synthesizer of the ICC system, further reinforcement signals from the processed audio signals that enhance the voice of the user in the processed audio signals for each zone in the subset of zones, the further reinforcement signals being generated for each zone in the subset of zones in the plurality of zones in the acoustic environment, the further reinforcement signals for each zone in the subset of zones comprising the voice of the user enhanced by adding a reverberation via a non-linear modification made to the processed audio signal or an uncorrelated signal added to the processed audio signal so that each further reinforcement signal is unique; and reproducing the further reinforcement signal in each zone in the subset of zones, wherein the reinforcement signal in each zone in the subset of the zones is reproduced by the at least one speaker in each zone of the subset of zones.

4. The non-transitory machine-readable medium of claim 3, wherein the machine-executable instructions to generate the further reinforcement signals cause the synthesizer of the ICC system to dynamically adjust the gains of the processed audio signals for each zone in the subset of zones.

5. An in-car communication (ICC) system that enhances voice through reinforcement in an acoustic environment, comprising:

a plurality of speakers;
a plurality of microphones;
a processor programmed to:

cause a reinforcement signal of a voice of a user to be reproduced in each zone in a subset of zones in a plurality of zones of an acoustic environment, wherein the reinforcement signal reproduced in each zone in the subset of zones comprises the voice of the user enhanced by adding a reverberation via a non-linear modification made to a processed audio signal or an uncorrelated signal added to the processed audio signal so that the reinforcement signal for each zone is unique, wherein the subset of zones being back zones of the acoustic environment for a front-to-back reinforcement or front zones of the acoustic environment for a back-to-front reinforcement;

cause a microphone signal to be captured for each microphone in the plurality of microphones contemporaneously with reproducing a reinforcement signal in each zone in the subset of zones, wherein at least one microphone is located in each zone in the plurality of zones of the acoustic environment;

cause a plurality of echo paths to be estimated from each speaker in the plurality of zones of the acoustic environment to each microphone in the plurality of microphones;

cause the reinforcement signals to be decorrelated, via a synthesizer of the ICC system, from the microphone signals in accordance with the plurality of echo paths and the reverberation of the reinforcement signal reproduced in the respective zone from which the respective microphone signal was captured to generate decorrelated microphone signals that are unique;

cause processed audio signals to be generated by removing echo contributions of each of the plurality of echo paths from the decorrelated microphone signals;

cause further reinforcement signals to be generated, via the synthesizer of the ICC system, from the processed audio signals that enhance the voice of the user in the processed audio signals for each zone in the subset of zones, the further reinforcement signals being generated for each zone in the subset of zones in the plurality of zones in the acoustic environment, the further reinforcement signals for each zone in the subset of zones comprising the voice of the user enhanced by adding a reverberation via a non-linear modification made to the processed audio signal or an uncorrelated signal added to the processed audio signal so that each further reinforcement signal is unique; and cause the further reinforcement signal in each zone in the subset of zones to be reproduced, wherein the reinforcement signal in each zone in the subset of the zones is reproduced by the at least one speaker in each zone in the subset of zones.

6. The system of claim 5, further comprising a post processor programmed to apply an adaptive gain in response to a sensor monitoring noise in a vehicle cabin.

7. The system of claim 5, further comprising a post processor programmed to apply an equalization in response to a sensor monitoring noise in a vehicle cabin.

8. The system of claim 5, wherein the processor is programmed to generate, via the synthesizer of the ICC system, the further reinforcement signals by dynamically adjusting the gains of the processed audio signals for each zone in the subset of zones.

9. The method of claim 1, wherein the synthesizer of the ICC system renders and adds the reverberation to the processed audio signal to generate the reinforcement signals.

10. The method of claim 1, wherein the synthesizer of the ICC system renders and adds the reverberation and a delay to the processed audio signal to generate the reinforcement signals.

11. The method of claim 1, wherein the synthesizer of the ICC system further renders and adds a synthesized voice to the processed audio signal to generate the reinforcement signals.

12. The method of claim 1, wherein the synthesizer of the ICC system adds a pitch shift to the processed audio signal to generate the reinforcement signals.

13. The method of claim 1, wherein generating the processed audio signals further comprises removing feedback from the decorrelated microphone signals.

14. The method of claim 1, wherein the acoustic environment is a vehicle cabin.

15. The method of claim 1, wherein the reinforcement signals and the further reinforcement signals provide left-to-right and right-to-left reinforcement between left zones of the acoustic environment and right zones of the acoustic environment.

16. The method of claim 1, wherein the front zones of a vehicle cabin are a driver's zone and a co-driver's zone, and the back zones of the vehicle cabin are the a passenger zone behind the driver's zone and a second passenger zone behind the co-driver zone.

17. The method of claim 1, wherein the microphone signal in each microphone comprises the reinforcement signal and an infotainment signal, with the reinforcement signal being the non-linear modification or uncorrelated signal.

18. The method of claim 1, further comprising increasing a volume level of the reinforcement signal based on a volume level of an infotainment signal in the microphone signal in each microphone.

* * * * *